July 25, 1961   J. H. O. HARRIES   2,993,403
PERIODICALLY DISPLACED OR ROTATABLE ELEMENTS
Filed June 7, 1957   4 Sheets-Sheet 3

2,993,403
PERIODICALLY DISPLACED OR ROTATABLE ELEMENTS

John Henry Owen Harries, Warwick, Bermuda, assignor to Harries Television Research Limited, Hamilton, Bermuda
Filed June 7, 1957, Ser. No. 664,363
Claims priority, application Great Britain June 15, 1956
21 Claims. (Cl. 88—14)

This invention relates to apparatus for periodically displacing or rotating an electrically operated element, examples of which are scanning elements for television, radar and oscilloscopes, scanners for use in the electromagnetic or mechanical propagation of waves for radar or other purposes, and armatures for relays and switches.

In prior devices of this kind, the mass or moment of inertia of the element has been severely limited, and as a result only a very small element could be used unless the frequency of operation was undesirably low. A further difficulty found with prior devices is that kinetic and potential energies which are stored in the device during each cycle of operation tend to be carried on from one cycle to the next, which can result in the element failing to remain in synchronism with the driving impulses. A further disadvantage of prior elements is that when they are in operation they tend to produce an objectionable acoustic output and to be subject to turbulent and variable damping by the surrounding air. Moreover they are often fragile and unduly sensitive to mechanical shock.

Usually with devices of this kind the element is to be periodically displaced or rotated from an initial position and zero velocity for the purpose of performing some function (such as the function of one of the elements exemplified above) and, after each such displacement or rotation, is to be restored to the initial position and to zero velocity in the shortest possible time so that the displacement or rotation can be repeated. The restoring or backward movement of the element is known as the "flyback" movement, and the time interval in which such backward movement occurs is known as the "flyback period." The present invention has for its principal object to provide a system which will enable the attainment of a higher frequency of periodic movement of the element, and a reduction in the time during which the element is restored to the initial position and zero velocity (to be called the flyback period) than has been possible with prior devices, or alternatively the use of elements of greater size and mass.

In the system according to the present invention the restoration of the vibratory element to the initial position and to zero velocity during the flyback period is effected by applying to an electric driving means associated with the element successive electric pulses of alternating polarities, whereby the element experiences successive moments or forces acting alternately in the direction of restoration and in the opposite direction, the first flyback pulse causing a moment or force in the direction of restoration. The characteristics of the flyback pulses are so chosen that at the end of the flyback period the element is substantially restored to the initial position and to zero velocity.

It will be understood that the initial position referred to is not necessarily the position taken up by the element in the absence of driving pulses in the electric driving means.

In the preferred embodiment of the invention, the restoration or flyback is achieved by applying to the driving means one pair of flyback pulses only. These pulses, which are of opposite polarity, may be of equal amplitude and are preferably in the form of square waves. The first flyback pulse results in the application to the element of a moment or force tending to restore it to the initial position, and also imparts to the element a restoring movement of relatively high velocity. The second flyback pulse results in the application to the element of a moment or force in the direction opposite to the direction of restoration and reduces the velocity of the element to bring it to a standstill; the wave forms, relative amplitudes and durations of the two flyback pulses being such that at the end of the flyback time the element is substantially restored to its initial position and zero velocity. However, in some applications it may be desirable to use more than one such pair of flyback pulses during the flyback time.

The flyback time can be made very short as compared to the natural periodic time of the system. The restoration of the element to zero velocity, and to the initial position, by the action of the flyback pulses during a flyback time much shorter than the natural period of the system, is a desirable result which to the best of my knowledge has not been attained in the prior art.

It is usually desirable that the response of the element to the driving moment or force during each period be independent of its response during the next period. It will then respond to the timing and amplitude of each driving impulse independently of the timing and amplitude of previous driving impulses. This requirement implies that no kinetic or potential energy of the element carries over from one period to the next. To ensure that this requirement is met, the time during each period when the element moves or rotates can be arranged to be rather less than the periodic time, the element remaining at substantially zero velocity and in its initial position for a short period following the flyback or restoring movement. This short period will be referred to as the quiescent period. It will be understood that the use of a quiescent period will enable a measure of variation of the timing of driving pulses to take place (as sometimes happens in, for example, television scanning systems) without causing the wave form of the displacement of the element to vary from one period to the next.

The element may be enclosed in a vacuum envelope, the atmospheric pressure inside the envelope being sufficiently low to prevent any appreciable acoustic output due to the movement of the element and substantially to eliminate any increase in the effective mass and damping due to the atmosphere. The element is in this way protected from the effects of changes of atmospheric pressure, noise, humidity, corrosion and dirt, and the operation will tend to be stable over long periods of time. In the case where the element is used in conjunction with light or other electromagnetic radiation such as, for instance, when it is used as a scanning mirror for television, or as a scanner for use with electromagnetic waves, the vacuum envelope may be transparent to the light or other radiation, or may include a transparent window made of glass or plastic, so that a beam of light or of electromagnetic radiation, which is to be deflected by the element, may travel into and out of the vacuum envelope.

The vibratory element may be supported in pivots or, preferably, in a spring type suspension so that it is movable against the restoring force of a spring or the like. The advantages of a spring suspension are, as is well known, an almost entire absence of wear and frictional effects, and a retention of the original operating characteristics over a long period of time, providing that the suspension is at no time subject to stress beyond its elastic limit. Suitable suspensions may be of the stretched metal string type or of other known kinds such as crossspring or other pivots. The suspension may be provided with viscous or other mechanical damping to prevent undesirable vibration.

It will usually be desirable to provide damping of the element so that any free oscillations produced by interfering transients, or, for example, by switching on or off the drive to the element, are arranged to die out within a short enough time to render the disturbance unobjectionable. The extent to which the system is electrically damped may be controlled by the internal resistance of the source of driving energy, for example, the anode impedance of a thermionic valve, or by a resistance connected across the driving circuit.

It will be appreciated that, in accordance with the invention, periodically displaced or rotated elements can be provided which have a much greater mass, and which therefore may be much larger than prior elements, having regard to the frequency at which the elements are to be displaced or rotated, and the shortness of the flyback period. This results, for example, in scanning mirrors for television, radar and the like, and for oscillioscopes, which are of a much greater optical area and are for use at unusually high scanning frequencies and for shorter flyback times than has been possible in the past. Similarly, relatively large scanners may be produced for use with electromagnetic or mechanically propagated waves for radar and the like, and armatures, relays and the like for operation at high repetition frequencies may be produced.

In order that the invention may be more clearly understood and readily carried into practice, some examples of elements and driving means constructed in accordance with the invention will now be more fully described with reference to the accompanying drawings, in which.

Figures 1, 2:
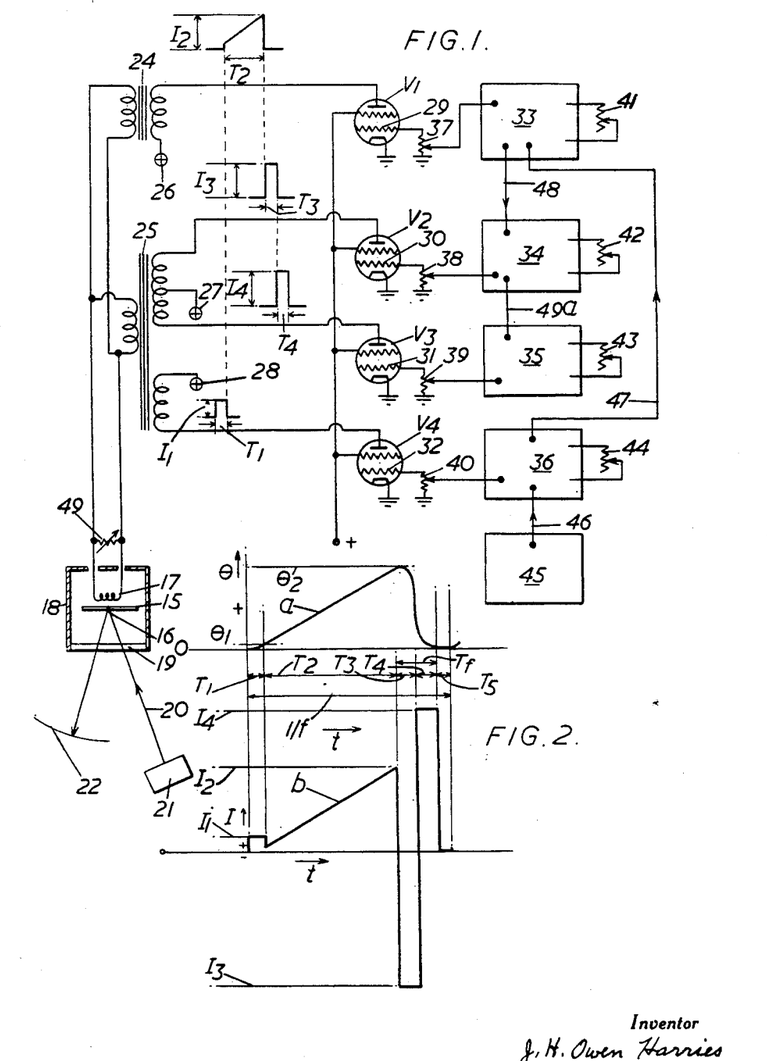
FIGURE 1 is a circuit diagram of apparatus for driving a rotatable element.
FIGURE 2 shows examples of displacement-time functions and current-time functions for the apparatus of FIGURE 1.

In FIGURE 1 an optical mirror 15 is rotatable (turnable) about the axis of a spring suspension 16, and is attached to a driving coil 17 which is located in a magnetic field. The miror 15, suspension 16 and driving coil 17 are enclosed in a vacuum container 18 having a transparent window 19 in one side. The mirror 15 experiences a turning moment M which is proportional to the magnitude of the current I passing through the driving coil 17, giving a relationship $M=CI$, where C is a constant determined by the geometry of the coil or armature, and the strength of the magnetic field. A beam of light 20 is projected from a source 21 through the window 19 on to the optical surface of the mirror 15, from which it is reflected through the window on to a viewing screen 22, and is caused to scan the viewing screen 22 by subjecting the scanning mirror 15 to a periodic rotation or oscillatory movement. This will be recognized as a device which may be used as a scanner for the reception of television or radar, in which instance the source 21 may represent a cathode ray tube together with an optical system, the electron beam of the cathode ray tube being deflected in one sense only to that it scans repeatedly along a single line of phosphor on its screen to provide a one-dimensional line scan, as in the well known "flying spot" scanner, the other dimension of the scan being provided by the mirror 15. Alternatively, the mirror 15 may be part of a time base for an oscilloscope, in which case the source 21 may comprise a lamp and an optical projection system. In either instance, the rotation of the mirror 15 can be arranged to provide a periodic linear displacement of the scanning spot over the viewing screen 22 at a repetition frequency which will be denoted by $f$ cycles per second.

The current I in the driving coil 17, the wave form of which is represented by the curve $b$ in FIGURE 2, is supplied by tetrode amplifying thermionic valves $V_1$, $V_2$, $V_3$ and $V_4$ through the transformers 24 and 25, the valve anodes being connected through the primary windings of the transformers to sources 26, 27 and 28 of positive H.T. potential. This wave form includes four successive pulses supplied respectively by the valve $V_1$, $V_2$, $V_3$ and $V_4$, as indicated in the wave form diagrams shown adjacent the anode conductors of the valves. The control grids 29, 30, 31 and 32 of the valves $V_1$, $V_2$, $V_3$ and $V_4$ are driven from synchronised pulse generators 33, 34, 35 and 36, respectively, of known design. The grids 29, 30, 31 and 32 of the valves are biased so that each valve is cut off except when a pulse is being applied to its grid. The pulse generators 34, 35 and 36 each include a monostable trigger circuit (sometimes known as a flip-flop). The pulse generator 33 also includes a monostable multivibrator, which may conveniently consist of a phantastron having a fast flyback triode circuit. This circuit generates a sawtooth wave form in the phantastron anode circuit and an inverted square wave of the same duration as the sawtooth in the screen grid circuit. The sawtooth is inverted by means of a triode amplifier and the two wave forms combined in a linear triode adding circuit. Appropriate gain controls enable the relative amplitudes of the pedestal and sawtooth to be varied. Alternatively, a monostable multivibrator may be used to produce a pedestal wave form combined with a sawtooth. Then the amplifier valve $V_1$ can have its bias varied in order to vary the relative amplitude of the sawtooth and pedestal in the wave form applied to the drive coil 17 and a damping resistance 49. The amplitudes $I_1$, $I_2$, $I_3$ and $I_4$ of the respective component pulses are controlled by the gain controls 37, 38, 39 and 40 and the durations $T_1$, $T_2$, $T_3$ and $T_4$ of the component pulses are respectively adjustable by the width controls 41, 42, 43 and 44.

At the beginning of each cycle, the pulse generators 33—36 are triggered into successive operation by a pulse from a source 45. If the mirror 15 is in use as a scanner for television, or the like, the source 45 may be a television or radar receiver or transmitter; alternatively, if the mirror is used to provide a time base for an oscilloscope, the source 45 may be a stabilised source of timing pulses. The triggering pulse from source 45 is fed by way of the link 46 to the pulse generator 36 in which it triggers the monostable trigger circuit. The trailing edge of the pulse $I_1$ produced by the latter is differentiated, for example, by means of a simple resistance-capacitance network, and fed to the pulse generator 33 by the link 47. The multivibrator circuit in the generator 33 is triggered into operation by this differentiated impulse and produces the pulse $I_2$, the trailing edge of which is likewise differentiated and applied through the link 48 to the pulse generator 34, in which it triggers the monostable trigger circuit into operation so that it produces the pulse $I_3$ of FIG. 1. Finally the trailing edge of the pulse $I_3$ is differentiated and fed to the trigger circuit in the pulse generator 35 through the link 49a so as to initiate the pulse $I_4$. In this way the component pulses of the wave form of the current I in the driving coil 17 are successively generated and applied to the valve $V_1$, $V_2$, $V_3$ and $V_4$ in sequence. The component pulses are then fed into and combined in the driving coil by the transformers 24 and 25. In the transformation process the positive pulse $I_3$ of FIG. 1 is reversed and becomes negative pulse $I_3$ of FIGURE 2.

The variable resistance 49 in FIGURE 1 provides an adjustable damping of the mirror 15 and suspension 16 so that disturbances due to interfering transients, or due to switching the apparatus on or off, are rendered unobjectionable.

The circuit illustrated in FIGURE 1 for providing the driving current to an element which is exemplified in that figure by mirror 15, is of course merely one of very many driving circuits of known kinds which can be combined and used for this purpose. In one example, the amplifying valves $V_1$, $V_2$, $V_3$ and $V_4$ can in many cases be omitted and the outputs from the trigger circuits in the sources 33, 34, 35 and 36 can be applied directly through the transformers 24 and 25 to the drive coil 17. The sources 33, 34, 35 and 36 may be combined.

The driving current may be caused to drive the mirror element by other driving means, for example, it may be passed through a coil acting upon an iron armature.

FIGURE 2 illustrates the wave form a of the rotation or angular displacement $\theta$ of the mirror, plotted as a function of the time t, and also shows the wave form b of the current I in the driving coil drawn to coincide as regards the time axis with the wave form a. The periodic time of repetition of the wave form is denoted by $1/f$, as shown, and this time period is subdivided for the purpose of explanation into the time intervals $T_1$, $T_2$, $T_3$, $T_4$ and $T_5$. At the start of the interval $T_1$ the mirror is in its initial position, i.e. its angular displacement is zero (FIGURE 2) and its angular velocity $\dot\theta$ is zero. Then the source 45 in FIGURE 1 produces a triggering pulse (as described above) and the pulse $I_1$ produced by the generator 36 causes an angular displacement $\theta_1$, (FIGURE 2). Next, the generator 33 produces the pulse $I_2$ of FIGURE 1, which consists of a linear sawtooth wave on a pedestal. The pulse $I_1$ accelerates the mirror up to a predetermined velocity $\dot\theta_s$ during $T_1$, and then the pulse $I_2$ produces an increase of angular displacement from $\theta_1$ to $\theta_2$ at constant angular velocity $\dot\theta_s$ during the interval $T_2$. The amplitude of the pedestal in the driving coil 17 during $T_2$ is small, compared with the amplitude of $I_2$. It is usually desirable for this linear scanning interval $T_2$ to be as large a proportion as possible of the total periodic time $1/f$. At the end of the scanning period $T_2$ the mirror 15 will have a substantial angular velocity denoted above by $\dot\theta_s$, and will also have reached its maximum angular displacement $\theta_2$. The mirror is then restored to the initial angular displacement of zero and to zero angular velocity within a flyback time which is denoted by $T_f$ in FIGURE 2 and which is preferably small in proportion to the periodic time $1/f$. In the embodiment of the invention which is being described this is done by the application of two flyback pulses $I_3$ and $I_4$ of opposite polarity which occur during the intervals $T_3$ and $T_4$ which together make up the flyback time $T_f$. In the present embodiment the flyback impulses are of approximately square shape and of equal and opposite amplitudes. The time durations $T_3$ and $T_4$ of the two pulses are shown as roughly equal, but the conditions necessary to return the mirror to zero angular velocity and to the initial angular displacement of zero within the flyback time $T_f$ are best attained by a manual adjustment of the amplitude or duration of at least one of the pulses. This adjustment can be performed by means of the gain controls 38, 39 or the duration controls 42, 43 which are shown in FIGURE 1. The mirror 15, having been returned to the conditions of $\theta=\dot\theta=0$ by the end of the flyback interval $T_f$, then remains quiescent during the interval $T_5$, as shown in FIGURE 2. The quiescent interval $T_5$ lasts until the next triggering impulse is generated by the source 45. Whilst it is generally preferable to utilise a quiescent interval $T_5$, yet in some applications this interval may be made zero. In this case the pulses $I_4$ and $I_1$ may coalesce and may be supplied in the form of one pulse from the pulse generator 35 in FIGURE 1. The pulse generator 36 and valve $V_4$ and the corresponding transformer winding may then be omitted.

It is not essential that the wave shape of the flyback pulses $T_3$ and $T_4$ be square, or that $I_3=-I_4$ (as shown in FIGURE 2); but it will be understood that square wave shapes will produce the greatest flyback displacement for given amplitudes of $I_3$ or $I_4$. As mentioned above, the relative time durations of the two flyback pulses are best adjusted manually, but I have found that if, for example, the resonant frequency of a typical element is very low (for example, 20 cycles/sec.) the duration of the first (negative) pulse should be very slightly longer than the duration of the second (positive) pulse; but if the resonant frequency is higher (for example 200 cycles/sec.) then the first pulse should have a very slightly shorter duration than that of the second pulse. In general, the amplitudes $I_3$ and $I_4$ will need to be increased if the moment of inertia of the element (such as the mirror 15 in FIGURE 1) is made greater or if the flyback period $T_f$ is made smaller.

The above description is concerned with the production of a linear increase of angular displacement during the interval $T_2$, given during the period $1/f$ the sawtooth of deflection required for television scanning and many other purposes. In other applications, however, the wave form of the pulse or pulses occurring before the flyback period may be adjusted to give other displacement-time functions before the flyback period.

Whilst the amplitudes and durations of the flyback pulses can in general be readily ascertained and adjusted, (for example by means of the manual gain control 38, 39 and the duration controls 42, 43 which are shown in FIGURE 1) it is nevertheless sometimes of assistance to calculate their approximate values beforehand. This may be done, together with calculations of the driving current wave form $I(t)$ needed to produce any given angular displacement function during the part of the period $1/f$ prior to the flyback period $T_f$, by the procedure described below.

It will be understood that if a vibratory element (such as the mirror 15 in FIGURE 1) has a moment of inertia J, and a spring suspension (such as the suspension 16 in FIGURE 2) which has a rotational stiffness k, and if the system has damping which can be denoted by a factor K, then the response of the mechanical system to a driving moment $M=CI$ can be represented by solutions of the appropriate differential equation which is, typically, $$\ddot\theta+2K\dot\theta+\frac{k}{J}\theta-\frac{M}{J}=0 \quad (1)$$

The moment M which is a function of time t and which during each of the time intervals $T_1$ and $T_2$, in FIGURE 2 is to be of such amplitude and wave form as to produce a desired angular displacement-time curve of the element during each of these intervals, can in general be computed directly from the known solutions of the differential Equation 1. At the beginning of the flyback period $T_f$, the respective values of $\theta$ and $\dot\theta$ will be the angular displacement $\theta_2$ (FIGURE 2) and the scanning velocity $\dot\theta_s$ which exist at the end of the time $T_2$. Appropriate values of the alternating flyback amplitudes $I_3$ and $I_4$ and their respective durations $T_3$ and $T_4$, which are necessary to bring $\theta$ and $\dot\theta$ to zero at the end of the flyback period $T_f$, can be found by successively calculating $\theta$ and $\dot\theta$ for various values of $T_3$ and $T_4$ whilst retaining the relationship $T_t=T_3+T_4$. I have found in particular that if in Equation 1 the factors K and k are treated as if they were zero, simple formulae result for the flyback pulses. These formulae are approximately and usefully applicable even when K and k are not in fact zero. For the purposes of these simplified formulae it is assumed that the wave forms of these two pulses are square and that $I_4=-I_3$. The simplified formulae are $$-\left(\frac{CI_3}{J}\right)=\left(\frac{CI_4}{J}\right)=\frac{(\dot{\theta}_s T_t+2\theta_2)+\sqrt{(\dot{\theta}_s T_t+2\theta_2)^2+T_t^2\dot{\theta}_s^2}}{T_t^2} \quad (2)$$

$$T_3=\frac{1}{2}\left(T_t+\frac{\dot{\theta}_s J}{CI_4}\right) \quad (3)$$

$$T_4=\frac{1}{2}\left(T_t-\frac{\dot{\theta}_s J}{CI_4}\right) \quad (4)$$

In these formulae $\theta_2$ and $\dot{\theta}_s$ denote respectively the angular displacement in radians and velocity in radians per second attained by the element at the beginning of the flyback ginterval $T_t$ measured in seconds. The moment of inertia J of the element is measured in kilogrammes-metre$^2$. The symbols $I_3$ and $I_4$ denote respectively the amplitudes in amperes of the first and second flyback pulses which occur during the interval $T_3$ and $T_4$. The constant C is that which represents the driving mechanism so that the driving moment is $M=CI$ where I is the current measured in amperes which flows through the driving coil or equivalent device. The constant C is in newtons-metre per ampere and may be evaluated by measurements on the mirror 15 in the presence of the magnetic field.

In the foregoing description it will be recognised that in the event that the element is adapted to be displaced linearly by the driving forces, instead of being rotated or turned (as exemplified in the foregoing description) the linear displacement and linear velocity, the inertia and the stiffness of the suspension can be substituted directly in the above description respectively for the angular displacement $\theta$, and angular velocity $\dot{\theta}$, the moment of inertia J and the rotational stiffness k of the suspension. The foregoing thus applies to vibratory elements adapted for linear displacement as well as those adapted for rotational displacement. Equations 1 to 4 do not take air damping into account and in many forms of the invention the element is operated in a vacuum so that the effects of atmospheric pressure are absent. Nevertheless I have found that even in those cases where air damping is present a useful prediction is obtained by the above, processes of calculation from these equations.

Figure 3A:
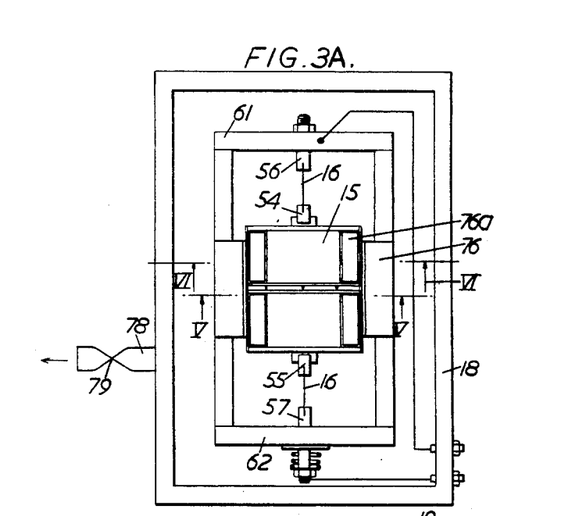
FIGURE 3A illustrates apparatus including a rotatable mirror element.
Figure 3B:
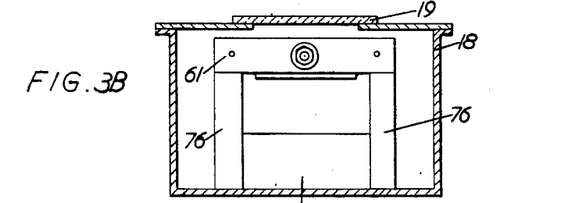
FIGURE 3B is a plan view of the apparatus of FIGURE 3A with the top of the casing removed.
Figures 4A, 4B, 5:
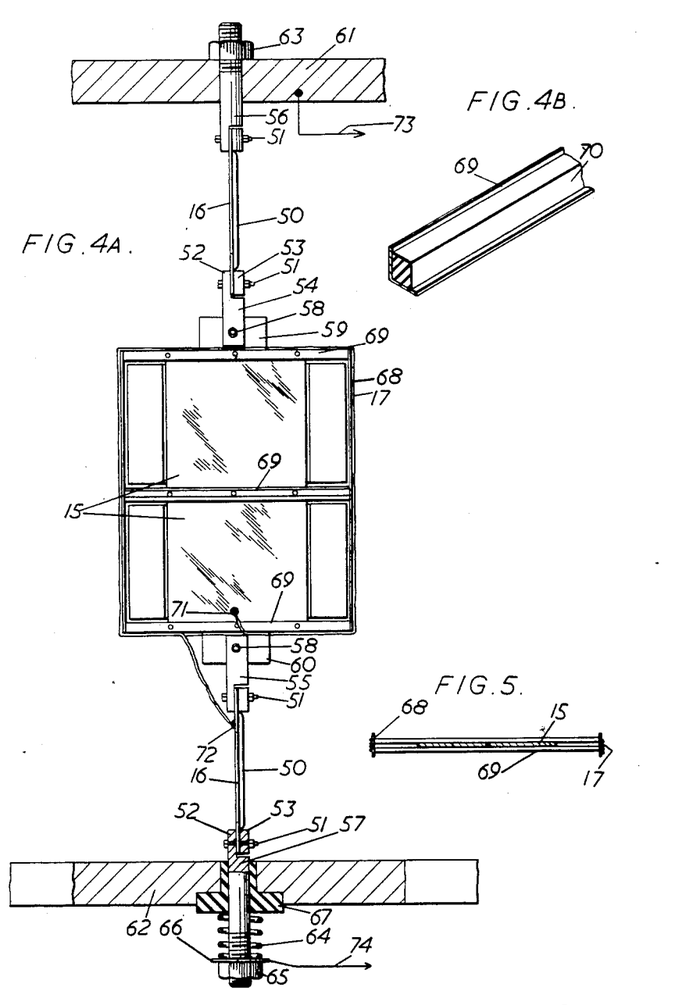
FIGURES 4A and 4B show details of the arrangement of a mirror element and its suspension.
FIGURE 5 is a cross-sectional view of a detail taken on the line V—V in FIGURE 3A.
Figure 6:
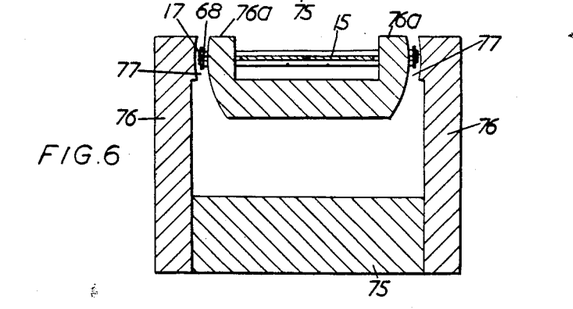
FIGURE 6 is a cross-sectional view taken on the line VI—VI in FIGURE 3A.

FIGURES 3A, 3B, 4A, 5 and 6 illustrate in greater detail an arrangement of a scanning mirror and the associated driving means inside a vacuum envelope. Parts shown in these figures which correspond to parts shown in FIGURE 1 have been given the same reference numerals as the latter parts. The mirror 15 and spring suspension 16 are arranged in a vacuum envelope 18 having a glass window 19. The mirror 15 consists of a plate made of light alloy, and its surface nearest to the window 19 in the vacuum envelope 18 is polished, lacquered and aluminised in known manner to form an optical mirror. The suspension 16 consists of flat springs which have a channel 50 pressed into them to increase their transverse stiffness, and are provided at their ends with fastening holes through which pass bolts 51 which secure the springs between the two jaw members 52 and 53 of clamps 54, 55, 56 and 57. The clamps 54 and 55 are secured by means of the bolts 58 to projections 59 and 60 of the mirror plate 15. The clamp 54 is of conducting material but the clamp 55 is made of an insulating material such as a linen-bonded phenolic plastic of high tensile strength which has a good electrical insulation resistance. The clamps 56 and 57 are screw-threaded at their outer ends and the assembly as a whole is suspended between supports 61 and 62 by means of the clamp 56 and a nut 63 at one end, and the clamp 57, an axial tensioning spring 64, a nut 65 and a washer 66 at the other end, the clamp at this latter end passing through an insulating bush 67 which also supports the washer 66. The plane of the wide dimension of the flat springs is at right angles to the plane of the mirror plate 15 so as to minimise accidental transverse deflections normal to that plane. A substantial axial tension, which may amount to 50-lbs. or more, may be applied to the mirror and suspension by tightening up the nut 65. The springs 16 become axially aligned automatically on application of this tension, and the resonant frequency of the system will increase. A driving coil 17 is wound around the mirror 15 on a frame 68 of light alloy and resin-bonded fabric, as shown in FIGURES 4A, 5 and 6. The frame is supported by three struts 69 which are shown in detail in FIGURE 4B. The struts and coil are stiffened by stiffeners 70 of resin-bonded fabric. The struts 69, stiffeners 70, frame 68 and coil 17 may be cemented by means of, for example, an epoxy resin, such as that sold by Aero Research Ltd., of Duxford, Cambridge, England, under the trade name of "Araldite." This resin may also be used to assist in fastening the springs to the insulating clamp 55 and to assist in fastening this clamp to the extension 60 of the mirror plate 15. The assembly thus forms a rigid and firm whole which is resistant to vibration or shock.

The driving coil 17 consists of four turns of No. 22 B & S gauge aluminium wire coated with enamel as an insulator. The ends of the coil are respectively connected to a point 71 on the mirror plate 15, and to the spring suspension at the point 72. The driving current is then applied to the connections 73 and 74 and flows through the spring supports, the drive coils and the mirror plate.

Referring to FIGURES 3B and 6 a permanent magnet 75 with pole pieces 76 is arranged to provide, in the gaps 77 between the pole pieces 76 and pole pieces 76a, a magnetic field which is transverse to the axis of the mirror suspension 16 and transverse to the turns of the coil 17. As a result, when the driving current I travels round the turns of the coil 17, the mirror plate 15 and the suspension 16 will be subject to a turning moment $M=CI$.

The vacuum envelope 18 and window 19 may be cemented together so as to form a vacuum-tight enclosure. This enclosure may be exhausted of air through a copper exhaust pipe 78. This pipe is closed when the exhaust has been completed by pinching together as shown at 79 in FIGURE 3.

In one instance of the use of a mirror such as that described with reference to FIGURES 3 to 6 in the system illustrated by FIGURES 1 and 2, the following quantities were measured:

Moment of inertia J ____ $4\times10^{-6}$ kilogrammes-metres$^2$.
Rotational stiffness of
 the spring suspen-
 sion k _______________ 0.11 newtons-metre per radian.
Resonant frequency
 of the system ________ 26.5 cycles per second.
Repetition frequency
 of the pulses _________ 30 cycles per second.

The approximate durations of the times represented in FIGURE 2B were

|  | Second |
|---|---|
| $T_1$ | 0.0004 |
| $T_2$ | 0.0296 |
| Flyback period $T_t$ | 0.00172 |
| $T_5$ | 0.0016 |

The times $T_3$ and $T_4$ were each approximately equal to 0.00086 second and were adjusted as previously described.

The axial dimension of the optical surface of the mirror 15 (FIGURE 3A) was 7.5 centimetres and the width at right angles to the axis was 4 centimetres. This provides an optical area of 30 square centimetres which is a sufficient area for the mirror to be able to deflect a light beam from a projection system of large numerical aperture; hence, a bright picture may be produced on the viewing screen 22 shown in FIGURE 1. In the prior art the optical area of a scanning mirror capable of operating at the above repetition frequency and flyback time, would not, to the best of my knowledge, exceed about one square centimetre thereby severely limiting the numerical aperture of the projection system and producing only a very dim picture on a viewing screen.

The approximate values of the maximum current pulses in the four-turn coil 49 per degree of maximum angular deflection $\theta_2$ were respectively $I_1/\theta_2$ ---------------------- 1.1 amperes per degree.
$I_2/\theta_2$ ---------------------- 0.17 ampere per degree.
$I_3/\theta_2$ ---------------------- 8.9 amperes per degree.
$I_4/\theta_2$ ---------------------- 8.9 amperes per degree.

The magnetic field of the magnet 75, 76 (FIGURE 6) was about 0.25 webers/metre$^2$.

The damping resistance 49 in FIGURE 1 when used with the above-described mirror was adjustable from 1.0 to 10 ohms and over this range the system could be damped to give no visible appreciable overshoot when subjected to substantial electrical transients. A typical value of $R_d$ was 2 ohms.

The relative amplitude of the pedestal and sawtooth parts of the pulse $I_2$ which occurs during $T_2$ was adjusted to obtain a linear deflection during $T_2$ as shown in FIGURE 2a.

Figure 7:
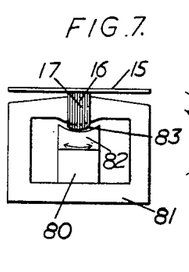
FIGURE 7 shows a further arrangement of a rotatable mirror element.

It will be understood that the invention may be applied to many other forms of element and driving mechanism, a few examples of other applications being illustrated in FIGURES 7, 8, 9, 10, 11, 12A and 12B, and 13. FIGURE 7 is an end view of a mirror plate 15 and a drive coil 17 which is suspended by a spring suspension 16 (which may be of the same general kind as that illustrated in FIGURE 4A). A permanent magnet 80 is provided, and a magnetic circuit 81 including a pole piece 82 has a gap 83 in which the coil is rotated when a driving current passes through the coil.

Figure 8:
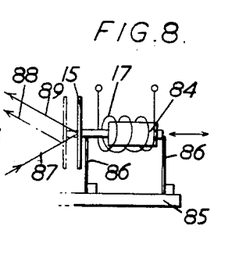
FIGURE 8 shows a mirror element arranged for periodic movements of displacement and restoration in accordance with the invention.

FIGURE 8 illustrates an element consisting of a mirror 15 which is attached to a soft iron armature 84 and which is mounted on a support 85 by means of springs 86, the driving coil 17 being fixed in position. When a driving current is passed through the coil 17 the iron armature 84 carrying the mirror will be displaced in an axial direction. An incident beam of light 87 is then reflected along the path 88 instead of the path 89. This change of position may be used for scanning or for oscillographic purposes.

Figure 9:
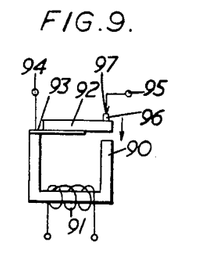
FIGURE 9 shows a relay which can be operated in accordance with the invention.

In FIGURE 9, there is shown a relay having an iron circuit 90 which can be excited by driving current passed through the relay coil 91. The armature 92, which is mounted on a spring 93, will then open or close a circuit connected to the terminals 94 and 95 by making and breaking the contact between the contact 96 and the spring contact 97. A very rapid make and break by the contacts 96 and 97, without high impact velocities when the armature is brought to rest, may be arranged in accordance with the present invention. In this application a square wave of current is passed periodically through the coil 91 so that during the square wave of current the armature 92 is displaced and the contacts 96 and 97 are pressed together. This contact may be broken, and the circuit connected to the terminals 94 and 95 may be opened very rapidly during the interval between the square waves of current, by applying flyback pulses which withdraw the armature contact 96 from the spring contact 97 in a very short flyback time. For this purpose armature 92 should be a permanent magnet or otherwise normally polarized.

Figure 10:
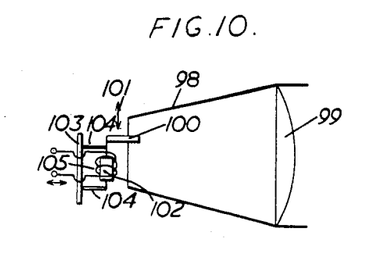
FIGURES 10 and 11 illustrate applications of the invention to scanning for radar systems.

FIGURE 10 illustrates a horn antenna 98 which includes a dielectric lens 99 for use on microwavelengths for radar. A feeder 100 is oscillated in the direction of the arrow 101 to swing the beam of waves radiated by the antenna over an angle so that the microwave beam scans a region. The feeder is mounted upon an armature 102 which is supported from a base 103 by a flat spring suspension 104. The driving coil 105 is fixed in position. When a driving current is passed through coil 105 the armature 102 and the feeder 100 will oscillate to and fro. The displacement-time curve of the feeder may be caused to follow that illustrated by curve a in FIGURE 2 by applying a wave form of driving current similar to the wave form b in FIGURE 2. Because the feeder 100 is not rotated but is displaced, $\theta$ and $\dot\theta$ in the description referring to FIGURE 2 should be regarded as respectively referring to displacement and displacement velocity.

Figure 11:
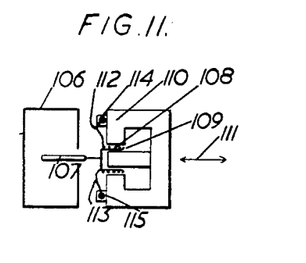

FIGURE 11 illustrates a further example of a radar scanner using the invention. It is well-known to scan a region with a microwave radar beam by periodically changing the effective width of a wave guide which is used to feed a suitable antenna. The wave length in the wave guide is thus varied in a periodic manner which causes the beam of the electromagnetic wave radiated by the antenna to scan over an angle. In the present example electromagnetic waves travel down the wave guide 106 in a direction perpendicular to the paper from a transmitter to an antenna, which are not shown in the drawing. The metal vane 107, which is attached to a driving coil 108 which is positioned in a cylindrical gap 109 in a magnetic circuit 110, is oscillated to and fro in the direction of the arrow 111 in accordance with the waveform of the current flowing through the coil 108. The driving current is fed into the driving coil through the flexible connections 112 and 113 which are connected to the terminals 114 and 115. The direction of the microwave beam will vary in accordance with the position of the vane 107 in the wave guide section 106, and in this way scanning is achieved. This method of causing a radar beam to scan is explained on page 129 (FIGURE 6.4.11(c)) of "Aerials for Centimetre Wave-lengths," by D. W. Fry and F. K. Goward, published in 1950 by Cambridge University Press. The wave form of the driving current may in accordance with the invention be of the kind illustrated in FIGURE 2. The displacement of the vane 107 will then follow the displacement-time curve shown by curve a of FIGURE 2 where the quantities $\theta$ and $\dot\theta$ are to be read as representing displacement and displacement velocity of the vane 107.

Figure 12A:
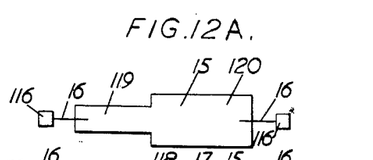
FIGURES 12A and 12B show a rotatable element, the driving moment of which is moved along the axis of rotation to minimise twisting.
Figure 12B:
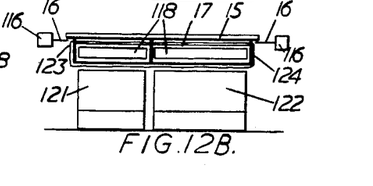

It will be appreciated that if the driving moment which is used to rotate an element is positioned along the axis of the element so that the driving moment is not equally applied along the axis with respect to the moment of inertia, and to the points of attachment of a stiff suspension, a twisting moment will tend to exist beween one part of the element and another along the axis of the rotation. It follows that it is preferable to minimise this twisting moment by arranging that the moment of ineria of the element and the driving moment bear a constant relationship to each other along the axis of the element having regard to the points of suspension. If the stiffness of the suspension is small its effect can be ignored. An example of this principle is illustrated in FIGURES 12A and 12B. A mirror plate 15 is suspended by a weak spring suspension 16 from supports 116, and can be driven by current passed round a driving coil 17 which lies in the field of magnet 117, 118. This device will be recognised to be similar to that device described above in FIGURE 7 with the exception that the mirror plate is divided into two parts, one part 119 being narrower than the other part 120. The moment of inertia of the part 119 will be much less than that of the part 120 and therefore the magnet is divided into two parts 121, 122 which co-operate respectively with two parts 123, 124 of driving coil 17. The magnetic moment due to the part 121 of the magnet and the magnetic moment due to part 122 of the magnet are arranged to bear the same relationship as that of the moments of inertia of the parts 119 and 120 of the mirror plate 115.

Figure 13:
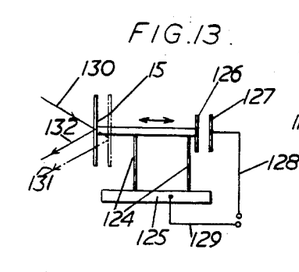
FIGURE 13 shows a system according to the invention employing electrostatic driving means.

Instead of driving the element by means of current I which is passed through a drive coil which is immersed in a magnetic field, the element may be driven by means of the electrostatic force produced across a pair of electrodes. In FIGURE 13 there is shown a mirror 15 mounted by means of flat springs 124 upon a base 125. When potentials are applied between the electrode 126 which is attached to the mirror 15 and a fixed electrode 127 by means of the conductors 128 and 129 the mirror will be displaced in the direction indicated by the arrow. An incident beam of light 130 is then reflected along the path 131 in one extreme position of the mirror and along the path 132 in the other extreme position. This change of position may be used for scanning or for oscillographic purposes. A steady biassing potential of considerable value is applied between the electrodes; then the displacement-time curve of the mirror 131 may be caused to follow that shown by curve $a$ in FIGURE 2 by applying a wave form of potential across the electrodes 126 and 127 which is similar to the wave form $b$ in FIGURE 2. In this case the ordinates of the wave form $b$ are to be regarded as referring to potential and not to current. Because the mirror is displaced, and not rotated, $\theta$ and $\dot{\theta}$ in the description referring to FIGURE 2 are to be regarded as respectively referring to displacement and displacement velocity.

I claim:

1. Apparatus for periodically displacing an element, comprising electrical means for periodically displacing said element from an initial position and from zero velocity to a predetermined position and a predetermined velocity, and restoring means for effecting backward movement of said element during a flyback period immediately after such displacement to restore said element to its initial position and to zero velocity, said restoring means comprising an electric driving means for applying a driving force to said element in one direction or reverse depending upon the polarity of the electric energy applied thereto, and means for applying thereto during said flyback period successive electric pulses of alternating polarity, whereby said restoring means applies to said element forces which are alternately in the direction of restoration and in the opposite direction, the first flyback pulse causing a force in the direction of restoration, the waveforms, relative amplitudes and durations of said flyback pulses being such that the element is restored substantially to the initial position and to zero velocity by the end of said flyback period.

2. Apparatus according to claim 1, including means supporting said element for angular displacement.

3. Apparatus according to claim 1, including means supporting said element for linear displacement.

4. Apparatus according to claim 1, in which said element is movable against the restoring force of resilient means, the duration of the flyback period being shorter than the resonant periodic time of said element.

5. Apparatus according to claim 1, including a spring suspension on which said element is supported for displacement from said initial position, said spring suspension having substantially greater stiffness to transverse shock in one direction than the other.

6. Apparatus according to claim 5, in which said suspension includes rectangular section springs which are under substantial axial tension, said apparatus including means for pivotally clamping said rectangular section springs to said element and to supports so that the suspension is self-aligning.

7. Apparatus according to claim 1, including a vacuum envelope enclosing said element, the atmospheric pressure inside said envelope being sufficiently low to prevent any appreciable acoustic output due to the movement of the element and substantially to eliminate increased effective mass and damping due to the atmosphere.

8. Apparatus according to claim 7, in which said element co-operates with a source of electromagnetic radiation outside said vacuum envelope, which is provided with a window transparent to the electromagnetic radiation.

9. Apparatus according to claim 1, in which said element is adapted to modify the direction if incident electromagnetic radiation.

10. Apparatus as claimed in claim 1, including adjustable means for damping the movement of the element.

11. Apparatus according to claim 1, in which said displacing means and said restoring means operate to maintain said flyback period small compared with the remainder of each period of the periodic movement.

12. Apparatus according to claim 1, in which said electric pulses aplied to said driving means during said flyback period are of substantially square waveform.

13. Apparatus according to claim 1, in which the means for applying electric pulses to said driving means during said flyback period generates the final flyback pulse of one periodic movement and the first pulse of the next periodic movement, which tends to cause displacement of the element away from the initial position and zero velocity reached at the end of said flyback period, as a single continuous pulse.

14. Apparatus according to claim 1, in which said displacing means and said restoring means operate to maintain said element stationary for a short time following the flyback period.

15. Apparatus for periodically rotating an element and restoring it to its initial position, comprising electrical means for periodically rotating said element from an initial position and from zero velocity to a predetermined position and from zero velocity to a predetermined position and a predetermined velocity, and restoring means for effecting backward movement of said element during a flyback period immediately after such rotation to restore said element to its initial position and to zero velocity, said restoring means comprising electric driving means having a driving coil attached to said element, a magnetic circuit having an air gap in which one side of said coil is located, and means for applying to said coil during said flyback period successive electric pulses of alternating polarity, whereby said driving coil applies to said element turning moments which are alternately in the direction of restoration and in the opposite direction, the first flyback pulse causing a moment in the direction of restoration, the waveforms, relative amplitudes and durations of said flyback pulses being such that the element is restored substantially to the initial position and to zero velocity by the end of said flyback period.

16. Apparatus according to claim 15, in which said element has its mass distributed non-uniformly along its axis of rotation and said driving coil and said magnetic circuit are so arranged along the axis of said element that the relative values of the moment of inertia of the element and the driving moment applied by said restoring means are substantially constant along the axis of rotation of said element.

17. Apparatus for periodically displacing a light-deflecting element and thereby modifying the direction of deflection of incident light comprising electrical means for periodically displacing said element from an initial position and from zero velocity to a predetermined position and a predetermined velocity, and restoring means for effecting backward movement of said element during a flyback period immediately after such displacement to restore said element to its initial position and to zero velocity, said restoring means comprising an electric driving means acting on said element, means for applying to said driving means during said flyback period a first flyback pulse of a polarity such that said light-deflecting element experiences a force in the direction of restoration, and means for applying to the electric driving means, after said first flyback pulse, a second flyback pulse of the opposite polarity, so that said element experiences a force in the opposite direction, the wavefroms, relative amplitudes and durations of said flyback pulses being such that the element is restored substantially to the initial position and to zero velocity by the end of said flyback period.

18. Apparatus for periodically displacing an element, comprising electrical means for periodically displacing said element from an initial position and from zero velocity to a predetermined position and a predetermined velocity, and restoring means for effecting backward movement of said element during a flyback period immediately after such displacement to restore said element to its initial position and to zero velocity, said restoring means comprising an electric driving means acting on said element, a first pulse generator for applying a flyback pulse of a first polarity to said driving means, a second pulse generator for applying a flyback pulse of the opposite polarity to said driving means, means whereby the first and second pulse generators operate in succession during said flyback period, whereby said driving means applies to said element forces which are alternately in the direction of restoration and in the opposite direction, the first flyback pulse causing a force in the direction of restoration, the waveforms, relative amplitudes and durations of said flyback pulses being such that the element is restored substantially to the initial position and to zero velocity by the end of said flyback period.

19. Apparatus as claimed in claim 18, including a source of triggering pulses arranged to trigger said first pulse generator, and means for differentiating the trailing edge of said flyback pulse from said first pulse generator, and means controlled by the pulse resulting from the differentiation to trigger said second pulse generator.

20. In radar apparatus, a scanner comprising a displaceable element adapted to modify the direction of a radar wave, electrical means for periodically displacing said element from an initial position and from zero velocity to a predetermined position and a predetermined velocity, and restoring means for effecting backward movement of said element during a flyback period immediately after such displacement to restore said element to its initial position and to zero velocity, said restoring means comprising an electric driving means acting on said element and means for applying thereto during said flyback period successive electric pulses of alternating polarity, whereby said driving means applies to said element forces which are alternately in the direction of restoration and in the opposite direction, the first flyback pulse causing a force in the direction of restoration, the waveforms, relative amplitudes and durations of said flyback pulses being such that the element is restored substantially to the initial position and to zero velocity by the end of said flyback period.

21. In apparatus in which a movable element is displaced periodically from an initial position and from zero velocity to a predetermined position and a predetermined velocity during the initial portion of each operating cycle and is restored to the initial position during the remaining or flyback period immediately after such displacement, the improvement comprising restoring means for effecting backward movement of said element to its initial position during said flyback period without overshoot, said restoring means comprising an electric driving means for applying a driving force to said element in one direction or reverse depending upon the polarity of energizing energy applied thereto, means for applying to said driving means during the initial portion of said flyback period a first electric pulse of a polarity to move said element in the direction of restoration, and means for thereafter applying to said driving means during said flyback period a second electric pulse of the opposite polarity and of an amplitude to reduce the velocity of the element in its flyback movement to zero value upon arriving at said initial position.

References Cited in the file of this patent
UNITED STATES PATENTS

| | | |
|---|---|---|
| 2,066,715 | Centeno | Jan. 5, 1937 |
| 2,179,607 | Bedford | Nov. 14, 1939 |
| 2,320,380 | Okolicsanyi | June 1, 1943 |
| 2,437,323 | Heigl | Mar. 9, 1948 |
| 2,463,785 | Lubcke | Mar. 9, 1949 |

FOREIGN PATENTS

| | | |
|---|---|---|
| 490,837 | Great Britain | Nov. 17, 1936 |